(12) United States Patent
Masser et al.

(10) Patent No.: US 10,152,143 B2
(45) Date of Patent: Dec. 11, 2018

(54) CUSTOMIZING INPUT DEVICE OPERATION (71) Applicant: International Business Machines Corporation, Armonk, NY (US)

(72) Inventors: Joel L. Masser, San Jose, CA (US); David C. Reed, Tucson, AZ (US); Max D. Smith, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 94 days.

(21) Appl. No.: 14/674,842

(22) Filed: Mar. 31, 2015

(65) Prior Publication Data

US 2016/0291705 A1 Oct. 6, 2016

(51) Int. Cl.
*G06F 3/0354* (2013.01)
*G06F 3/038* (2013.01)

(52) U.S. Cl.
CPC .......... *G06F 3/03543* (2013.01); *G06F 3/038* (2013.01)

(58) Field of Classification Search
CPC .................................................. G06F 3/03543
See application file for complete search history.

(56) References Cited

U.S. PATENT DOCUMENTS

| 8,321,813 | B2 | 11/2012 | Chen et al. |
| 8,711,095 | B2 | 4/2014 | Tan et al. |
| 2007/0239604 | A1* | 10/2007 | O'Connell ............. G06Q 30/06 705/50 |
| 2008/0042978 | A1* | 2/2008 | Perez-Noguera ..... G06F 3/0202 345/168 |
| 2009/0222726 | A1* | 9/2009 | Kintzley ............. G06F 9/45512 715/704 |
| 2010/0127983 | A1* | 5/2010 | Irani ................... G06F 3/03543 345/163 |
| 2010/0271326 | A1* | 10/2010 | Hu ........................ G06F 3/0414 345/174 |
| 2010/0281184 | A1* | 11/2010 | Chang ................. G06F 3/03543 710/13 |
| 2011/0069028 | A1* | 3/2011 | Li .......................... G06F 3/0416 345/173 |
| 2012/0256836 | A1 | 10/2012 | Rudinsky |
| 2014/0098061 | A1* | 4/2014 | Huang ................ G06F 3/04883 345/174 |

FOREIGN PATENT DOCUMENTS

| JP | 2000214998 | 8/2000 |
| KR | 2005053213 | 6/2005 |

* cited by examiner

*Primary Examiner* — Aneeta Yodichkas
(74) *Attorney, Agent, or Firm* — Kunzler. PC (57) ABSTRACT An apparatus, method, system, and program product are disclosed for customizing input device operation. In one example, an apparatus includes an interface module that receives an input click pattern from an input device. The apparatus also includes a comparison module that compares the input click pattern to a user defined click pattern. The apparatus includes an execution module that performs a user defined action corresponding to the user defined click pattern in response to the input click pattern matching the user defined click pattern.

20 Claims, 5 Drawing Sheets

CUSTOMIZING INPUT DEVICE OPERATION

FIELD

The subject matter disclosed herein relates to input devices and more particularly relates to customizing input device operation.

BACKGROUND

An input device, such as a mouse, a stylus, a keyboard, a touch-screen, and the like, may be used to provide input to an information handling device.

BRIEF SUMMARY

An apparatus for customizing input device operation is disclosed. A method and computer program product also perform the functions of the apparatus. In one embodiment, an apparatus includes an interface module that receives an input click pattern from an input device. The apparatus, in a further embodiment, includes a comparison module that compares the input click pattern to a user defined click pattern. In various embodiment, the apparatus includes an execution module that performs a user defined action corresponding to the user defined click pattern in response to the input click pattern matching the user defined click pattern. In certain embodiments, at least a portion of the input module, the comparison module, and the execution module includes one or more of hardware and program instructions. The program instructions may be stored on one or more computer readable storage media.

A method for customizing input device operation, in one embodiment, includes receiving an input click pattern from an input device. The method may also include comparing the input click pattern to a user defined click pattern. The method may include performing a user defined action corresponding to the user defined click pattern in response to the input click pattern matching the user defined click pattern.

In one embodiment, a computer program product for customizing input device operation includes a computer readable storage medium having program instructions embodied therewith. The program instructions, in some embodiments, are executable by a processor to cause the processor to receive an input click pattern from an input device. The program instructions, in one embodiment, are executable by a processor to cause the processor to compare the input click pattern to a user defined click pattern. In a further embodiment, the program instructions are executable by a processor to cause the processor to perform a user defined action corresponding to the user defined click pattern in response to the input click pattern matching the user defined click pattern.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
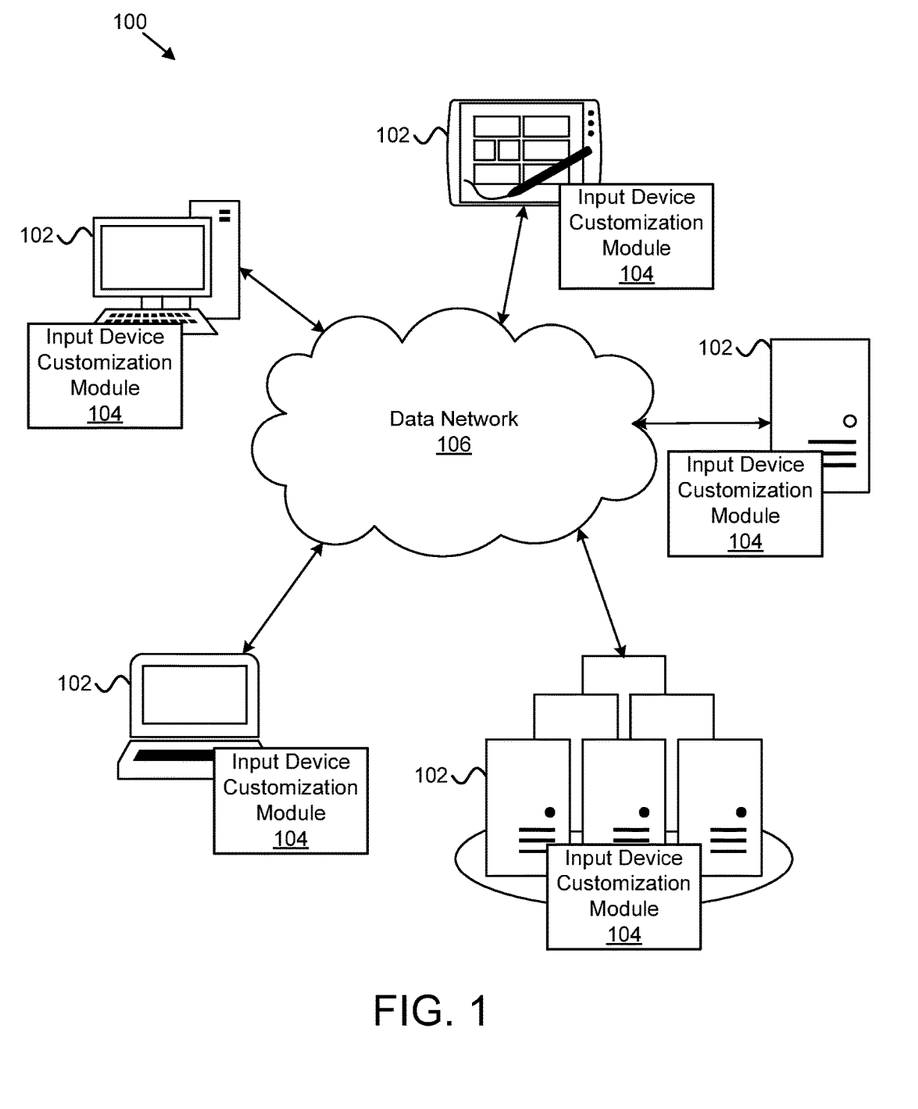
FIG. 1 is a schematic block diagram illustrating one embodiment of a system for customizing input device operation in accordance with one embodiment of the present invention.

FIG. 1 depicts one embodiment of a system 100 for customizing input device operation. In one embodiment, the system 100 includes information handling devices 102, input device customization modules 104, and networks 106. Even though a particular number of information handling devices 102, input device customization modules 104, and networks 106 are depicted in the system 100 of FIG. 1, one of skill in the art will recognize that any number or configuration of information handling devices 102, input device customization modules 104, and networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated information handling devices 102. Moreover, the information handling devices 102 may comprise one or more storage volumes, storage devices, RAID devices or configurations, or the like, such as hard-disk drives, solid-state drives, flash memory devices, random-access memory (RAM), SATA devices, tape devices, or the like. In some embodiments, the information handling devices 102 are in communication via one or more data networks 106, described below.

In one embodiment, the input device customization module 104 receives an input click pattern from an input device, such as a stylus, mouse, input-sensitive display, keyboard, or the like. The input device customization module 104 compares the input click pattern to a user defined click pattern. The input device customization module 104 may also perform a user defined action corresponding to the user defined click pattern in response to the input click pattern matching the user defined click pattern. In this manner, the input device customization module 104 may facilitate customized operation of an input device to enhance operation of the information handling device 102. Ultimately, this may allow a user of the information handling device 102 to perform various operations faster and/or more efficiently. In certain embodiments, as described below with reference to FIGS. 2 and 3, the input device customization module 104 includes multiple modules that perform the operations of the input device customization module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

Figure 2:
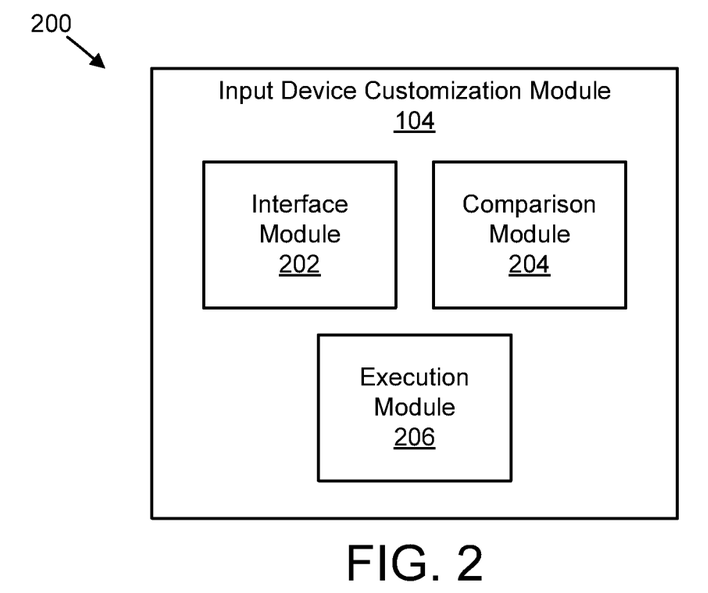
FIG. 2 is a schematic block diagram illustrating one embodiment of a module for customizing input device operation in accordance with one embodiment of the present invention.

FIG. 2 is a schematic block diagram illustrating one embodiment of a module 200 for customizing input device operation. In one embodiment, the module 200 includes an embodiment of an input device customization module 104. The input device customization module 104, in various embodiment, includes one or more of an interface module 202, a comparison module 204, and an execution module 206, which are described in more detail below.

In one embodiment, the interface module 202 receives an input click pattern from an input device. As may be appreciated, the interface module 202 may receive the input click pattern from the input device via wireless and/or wired communication. Moreover, the input click pattern may be any suitable click pattern. Indeed, the input click pattern may include a predetermined number of clicks, a predetermined time between clicks, a predetermined input function (e.g., button, touch, key press, etc.) used for each click, and a predetermined length of each click. In certain embodiments, the input click pattern may be similar to Morse code, thereby including a combination of long clicks, short clicks, long pauses, and/or short pauses. For example, one click pattern may be three short clicks of a left mouse button. As another example, another click pattern may be one short click of the left mouse button, followed by a long click of a right mouse button, followed by another short click of the left mouse button. As a further example, a click pattern may be a long click of the left mouse button, followed by a short pause, followed by a long click of the left mouse button.

In certain embodiments, a short click may be produced in response to an input function (e.g., button) of an input device being applied (e.g., a button held down) for a time period less than a predetermined threshold. For example, the predetermined threshold may be 0.5 ms, 1 ms, 3 ms, 5 ms, 10 ms, or the like, and for a short click, a button of an input device is held down for less than the predetermined threshold. Furthermore, a long click may be produced in response to an input function of the input device being applied for a time period greater than the predetermined threshold. Moreover, a short pause may be a time period less than the predetermined threshold in which no input function of the input device is applied. In contrast, a long pause may be a time period greater than the predetermined threshold in which no input function of the input device is applied. As may be appreciated, the predetermined threshold for clicks and pauses may be different.

The input device may be any suitable device capable of providing input to the information handling device 102. For example, the input device may be a stylus, a mouse, a remote control, an input-sensitive display, a keyboard, a camera, a sensor, and the like. It should be noted that the term "click" as used herein may refer to any suitable method of providing input, such as pressing a button, typing a key on a keyboard, touching an input-sensitive display, detecting a motion, and so forth.

The comparison module 204, in one embodiment, compares the input click pattern to a user defined click pattern. Similar to the input click pattern, the user defined click pattern may be any suitable click pattern such as a click pattern that includes one or more of a predetermined number of clicks, a predetermined time between clicks, a predetermined input function used for each click, and a predetermined length of each click. The comparison module 204 compares the input click pattern to the user defined click pattern to determine whether the input click pattern matches the user defined click pattern.

Again, similar to the input click pattern, the user defined click pattern may be similar to Morse code, thereby including a combination of long clicks, short clicks, long pauses, and/or short pauses. Moreover, in some embodiments, a short click may be a click in which an input function of an input device is applied for a time period less than a predetermined threshold. For example, the predetermined threshold may be 0.5 ms, 1 ms, 3 ms, 5 ms, 10 ms, or the like, and for a short click, the button of the input device is held down for less than the predetermined threshold. Furthermore, a long click may be a click in which an input function of the input device is applied for a time period greater than the predetermined threshold. In addition, a short pause may be a time period less than the predetermined threshold in which no input function of the input device is applied. In contrast, a long pause may be a time period greater than the predetermined threshold in which no input function of the input device is applied. As may be appreciated, the predetermined threshold for clicks and pauses may be different.

For the comparison module 204 to determine whether the input click pattern matches the user defined click pattern, the comparison module 204 may determine whether the input click pattern is within a predetermined threshold or tolerance of the user defined click pattern. If the input click pattern is within the predetermined threshold or tolerance of the user defined click pattern, the input click pattern may be considered to match the user defined click pattern and/or to be substantially similar to the user defined click pattern.

The execution module 206, in one embodiment, performs a user defined action corresponding to the user defined click pattern in response to the input click pattern matching the user defined click pattern. The user defined action may include any type of action that may be defined by a user. For example, the user defined action may include one or more of saving a file, renaming a file, resizing an object, selecting an object, selecting a menu option, executing a macro, performing a series of functions, printing a picture, printing a file, and navigating an application. In some embodiments, the execution module 206 may perform the user defined action only if the cursor is positioned at a predetermined location. For example, in certain embodiments, the execution module 206 may perform the user defined action only if the cursor is positioned over a certain object such as text, a hyperlink, an image, an icon, a webpage, a document, an audio file, and so forth.

As may be appreciated, each user defined click pattern may be linked to a specific user defined action to be performed in response to the input click pattern matching the user defined click pattern. In some embodiments, the user defined click pattern and the user defined action may be associated with a specific application. In other embodiments, the user defined click pattern and the user defined action may be associated with all applications. Moreover, in certain embodiments, the user defined click pattern and the user defined action may also be associated with an object that the cursor is positioned over in order to perform the user defined action.

In certain embodiments, at least a portion of the input module 202, the comparison module 204, and the execution module 206 include one or more of hardware and program instructions. In such embodiments, the program instructions may be stored on one or more computer readable storage media.

Figure 3:
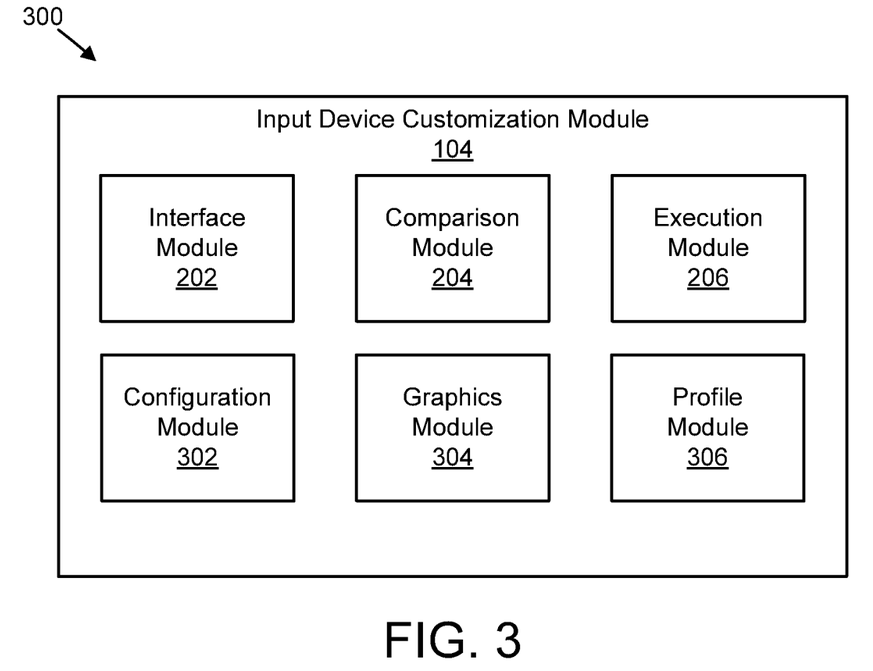
FIG. 3 is a schematic block diagram illustrating one embodiment of another module for customizing input device operation in accordance with one embodiment of the present invention.

FIG. 3 is a schematic block diagram illustrating one embodiment of another module 300 for customizing input device operation. In one embodiment, the module 300 includes an embodiment of an input device customization module 104. The input device customization module 104, in various embodiments, includes one or more of an interface module 202, a comparison module 204, and an execution module 206, which may be substantially similar to the interface module 202, the comparison module 204, and the execution module 206 described above. The input device customization module 104 may also include one or more of a configuration module 302, a graphics module 304, and a profile module 306, which are described in more detail below.

In one embodiment, the configuration module 302 receives a selection of a user defined action. In other words, the configuration module 302 facilitates a user being able to select a user defined action to be associated with each user defined click pattern. In certain embodiments, the user may select the user defined action from a list of multiple user defined actions. In some embodiments, the user may create a new user defined action to be performed. As may be appreciated, the user defined action may be any suitable action or combination of actions that may be performed by the information handling device 102. Such a user defined action may include one or more of saving a file, renaming a file, resizing an object, selecting an object, selecting a menu option, executing a macro, performing a series of functions, printing a picture, printing a file, opening an application, opening a file, copying data, uploading data, downloading data, displaying a pop-up menu, loading a webpage, bypassing cache, translating a text, translating a webpage, reading displayed text as audio, reading selected text as audio, and navigating an application, and the like. It should be noted that selected text may include one or more words, sentences, paragraphs, and the like.

In certain embodiments, the configuration module 302 may be used to select user defined click patterns from a list of user defined click patterns. In addition, in some embodiments, the configuration module 302 may enable the user to create a new user defined click pattern. The configuration module 302 stores the user defined click patterns and their associated user defined actions. The configuration module 302 may also store associated applications and cursor positions associated with the user defined click patterns. In some embodiments, a user defined click pattern may be associated with one user defined action, while in other embodiments, a user defined click pattern may be associated with multiple user defined actions.

The graphics module 304, in certain embodiments, identifies a cursor position corresponding to the input device. The graphics module 304 may compare the cursor position to a position of a graphical feature of an application. Moreover, the graphics module 304 may change a cursor graphic in response to the cursor position being proximate to the position of the graphical feature. In some embodiments, the cursor graphic is changed in response to the cursor position being proximate to one or more of text, an image, a link, a link to a page within a website, and a link to a page not within the website. The cursor graphic may change in any suitable way. For example, a size, a color, an image, and/or a refresh rate of the cursor graphic may change. In some embodiments, the configuration module 302 may enable the user to define an association between a cursor graphic and a graphical feature. For example, the user may define the way the cursor graphic changes while the cursor is positioned over the graphical feature.

In one embodiment, the configuration module 302 may enable the user to define an association between a cursor position remaining stationary over a graphical feature and a user defined action to be performed in response to the cursor position remaining stationary over the graphical feature. For example, a menu corresponding to the graphical feature may be displayed if the cursor position remains stationary over the graphical feature for a predetermined period of time. As another example, file information corresponding to the graphical feature may be displayed if the cursor position remains stationary over the graphical feature for a predetermined period of time.

In certain embodiments, the graphics module 304 may change the graphical feature in response to the cursor position being proximate to the position of the graphical feature. In such embodiments, changing the graphical feature may include one or more of changing a color of the graphical feature, underlining the graphical feature, and changing a size of the graphical feature. For example, if the cursor position is proximate to a hyperlink, the hyperlink may change color or size. As another example, if the cursor position is proximate to an image, the image may change in size. The configuration module 302 may enable the user to define an association between the cursor position and the graphical feature. For example, the user may define the way the graphical feature changes in response to the cursor being positioned over the graphical feature.

In certain embodiments, the profile module 302 may organize groups of user defined associations into profiles (e.g., multiple associations between user defined click patterns and user defined actions). A profile may include user defined associations for one or more applications. Responses to input from the input device may depend on the profile that is selected. A user may create any number of profiles. For example, a user may create a work profile and a home profile, or a user may create profiles for other suitable purpose or situation.

In one embodiment, the profile module 306 may receive a selection of a profile corresponding to the input device. In some embodiments, a profile may be selected in response to a user defined click pattern. For example, in one embodiment, a profile may be selected by a pop-up menu that is displayed after a right-mouse button is clicked. Furthermore, the profile module 306 may enable creation of new profiles and/or editing of previously created profiles in response to a user defined click pattern.

Figure 4:
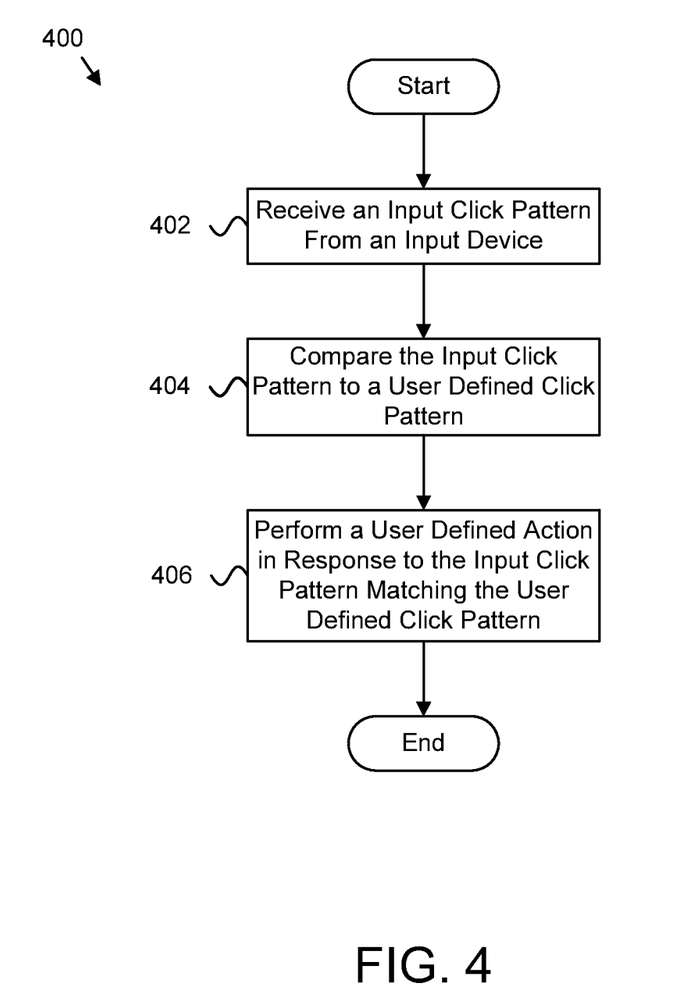
FIG. 4 is a schematic flow chart diagram illustrating one embodiment of a method for customizing input device operation in accordance with one embodiment of the present invention.

FIG. 4 is a schematic flow chart diagram illustrating one embodiment of a method 400 for customizing input device operation. In one embodiment, the method 400 begins and the interface module 202 receives 402 an input click pattern from an input device. The comparison module 204, in certain embodiments, compares 404 the input click pattern to a user defined click pattern. In one embodiment, the execution module 206 performs 406 a user defined action corresponding to the user defined click pattern in response to the input click pattern matching the user defined click pattern, and the method 400 ends.

Figure 5:
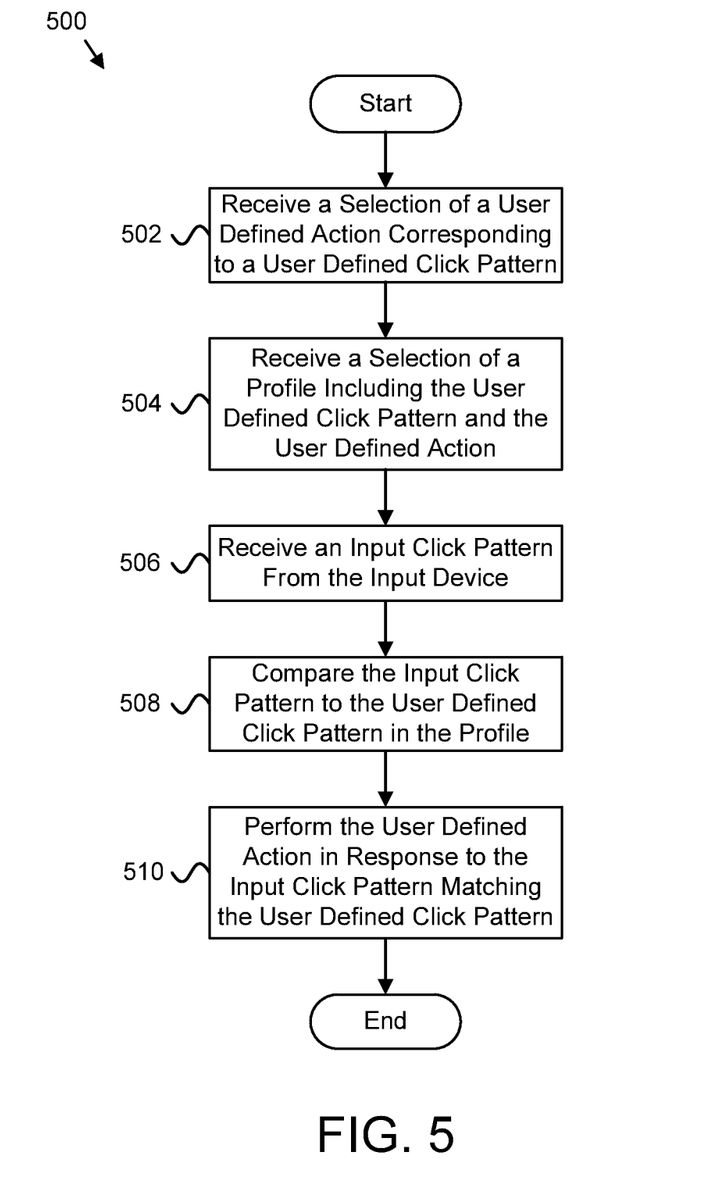
FIG. 5 is a schematic flow chart diagram illustrating one embodiment of another method for customizing input device operation in accordance with one embodiment of the present invention.

FIG. 5 is a schematic flow chart diagram illustrating one embodiment of another method 500 for customizing input device operation. In one embodiment, the method 500 begins and the configuration module 302 receives 502 a selection of a user defined action corresponding to a user defined click pattern. As may be appreciated, the user defined action may be selected from a number of possible user defined actions or may be created as a new user defined action. In some embodiments, the profile module 306 receives 504 a selection of a profile corresponding to an input device. The profile includes multiple user defined click patterns and a corresponding user defined action for each user defined click pattern. In an embodiment, the interface module 202 receives 506 an input click pattern from the input device. The comparison module 204, in certain embodiments, compares 508 the input click pattern to the user defined click pattern in the profile. In one embodiment, the execution module 206 performs 510 the user defined action corresponding to the user defined click pattern in response to the input click pattern matching the user defined click pattern, and the method 500 ends.

Figure 6:
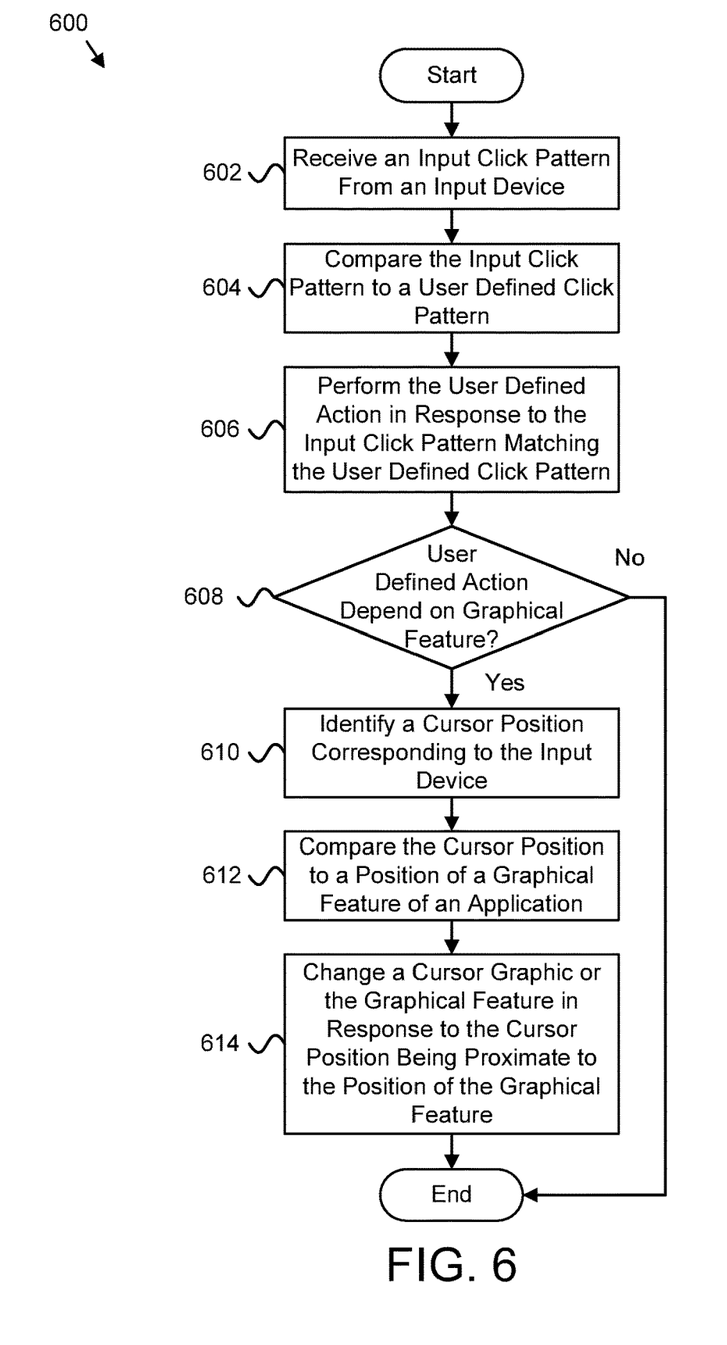
FIG. 6 is a schematic flow chart diagram illustrating one embodiment of a further method for customizing input device operation in accordance with one embodiment of the present invention.

FIG. 6 is a schematic flow chart diagram illustrating one embodiment of a further method 600 for customizing input device operation. In one embodiment, the method 600 begins and the interface module 202 receives 602 an input click pattern from an input device. The comparison module 204, in certain embodiments, compares 604 the input click pattern to a user defined click pattern. In one embodiment, the execution module 206 performs 606 the user defined action corresponding to the user defined click pattern in response to the input click pattern matching the user defined click pattern.

In certain embodiments, the execution module 206 determines 608 whether the user defined action depends on a graphical feature. If the execution module 206 determines 608 that the user defined action does not depend on a graphical feature, the method 600 ends. However, if the execution module 206 determines 608 that the user defined action depends on a graphical feature, the graphics module 304 identifies 610 a cursor position corresponding to the input device. Moreover, in certain embodiments, the graphics module 304 compares 612 the cursor position to a position of a graphical feature of an application. In some embodiments, the graphics module 304 changes 614 a cursor graphic and/or the graphical feature in response to the cursor position being proximate (e.g., near or over) to the position of the graphical feature, and the method 600 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an interface module internal to the apparatus that receives an input click pattern from an input device external to the apparatus, wherein the input device comprises a mouse;
a comparison module internal to the apparatus that compares the input click pattern to a user defined click pattern; and
an execution module internal to the apparatus that performs a user defined action corresponding to the user defined click pattern in response to the input click pattern matching the user defined click pattern, wherein the user defined click pattern and the user defined action are defined by a user of the apparatus, the user defined action is not part of a pool of preexisting actions, and the user defined action is an action performed on an application of the apparatus;
wherein at least a portion of the input module, the comparison module, and the execution module comprise one or more of hardware and program instructions, the program instructions stored on one or more non-transitory computer readable storage media.

2. The apparatus of claim 1, further comprising a configuration module that receives a selection of the user defined action, wherein the selection of the user defined action is selected from a plurality of user defined actions.

3. The apparatus of claim 1, wherein the user defined click pattern comprises one or more of a predetermined number of clicks, a predetermined time between clicks, a predetermined input function used for each click, and a predetermined length of each click.

4. The apparatus of claim 1, further comprising a graphics module that identifies a cursor position corresponding to the input device.

5. The apparatus of claim 1, further comprising a profile module that receives a selection of a profile corresponding to the input device, wherein the profile comprises a plurality of user defined click patterns and a corresponding user defined action for each user defined click pattern of the plurality of user defined click patterns.

6. A method for customizing input device operation, comprising:
receiving, by an apparatus, an input click pattern from an input device external to the apparatus, wherein the input device comprises a mouse;
comparing, by the apparatus, the input click pattern to a user defined click pattern; and
performing, by the apparatus, a user defined action corresponding to the user defined click pattern in response to the input click pattern matching the user defined click pattern, wherein the user defined click pattern and the user defined action are defined by a user of the apparatus, the user defined action is not part of a pool of preexisting actions, and the user defined action is an action performed on an application of the apparatus.

7. The method of claim 6, further comprising receiving a selection of the user defined action, wherein the selection of the user defined action is selected from a plurality of user defined actions.

8. The method of claim 6, wherein receiving the input click pattern from the input device comprises receiving the input click pattern from the mouse.

9. The method of claim 6, wherein comparing the input click pattern to the user defined click pattern comprises comparing the input click pattern to one or more of a predetermined number of clicks, a predetermined time between clicks, a predetermined input function used for each click, and a predetermined length of each click.

10. The method of claim 6, wherein performing the user defined action comprises one or more of saving a file, renaming a file, resizing an object, selecting an object, selecting a menu option, executing a macro, performing a series of functions, and navigating an application.

11. The method of claim 6, further comprising identifying a cursor position corresponding to the input device.

12. The method of claim 11, further comprising comparing the cursor position to a position of a graphical feature of an application.

13. The method of claim 12, further comprising changing a cursor graphic in response to the cursor position being proximate to the position of the graphical feature.

14. The method of claim 13, wherein changing the cursor graphic in response to the cursor position further comprises changing the cursor graphic in response to the cursor position being proximate to one or more of text, an image, a link, a link to a page within a website, and a link to a page not within the website.

15. The method of claim 12, further comprising changing the graphical feature in response to the cursor position being proximate to the position of the graphical feature.

16. The method of claim 15, wherein changing the graphical feature comprises one or more of changing a color of the graphical feature, underlining the graphical feature, and changing a size of the graphical feature.

17. The method of claim 6, further comprising receiving a selection of a profile corresponding to the input device, wherein the profile comprises a plurality of user defined click patterns and a corresponding user defined action for each user defined click pattern of the plurality of user defined click patterns.

18. A computer program product for customizing input device operation, the computer program product comprising a non-transitory computer readable storage medium having program instructions embodied therewith, the program instructions executable by a processor to cause the processor to:
receive, by an apparatus, an input click pattern from an input device external to the apparatus, wherein the input device comprises a mouse;
compare, by the apparatus, the input click pattern to a user defined click pattern; and
perform, by the apparatus, a user defined action corresponding to the user defined click pattern in response to the input click pattern matching the user defined click pattern, wherein the user defined click pattern and the user defined action are defined by a user of the apparatus, the user defined action is not part of preexisting actions, and the user defined action is an action performed on an application of the apparatus.

19. The computer program product of claim 18, wherein the program instructions cause the processor to receive a selection of the user defined action, wherein the selection of the user defined action is selected from a plurality of user defined actions.

20. The computer program product of claim 18, wherein the user defined click pattern comprises one or more of a predetermined number of clicks, a predetermined time between clicks, a predetermined input function used for each click, and a predetermined length of each click.

* * * * *